(No Model.)

E. H. CHAPPIUS.
CYCLE HANDLE BAR FASTENING ATTACHMENT.

No. 604,876. Patented May 31, 1898.

Witnesses,

Inventor,
Edward H. Chappius
By Dewey & Co.
Attys

UNITED STATES PATENT OFFICE.

EDWARD H. CHAPPIUS, OF MARYSVILLE, CALIFORNIA.

CYCLE-HANDLE-BAR FASTENING ATTACHMENT.

SPECIFICATION forming part of Letters Patent No. 604,876, dated May 31, 1898.

Application filed December 13, 1897. Serial No. 661,728. (No model.)

*To all whom it may concern:*

Be it known that I, EDWARD H. CHAPPIUS, a citizen of the United States, residing at Marysville, county of Yuba, State of California, have invented an Improvement in Cycle-Handle-Bar Fastening Attachments; and I hereby declare the following to be a full, clear, and exact description of the same.

My invention relates to a means for securing the handle-bars of bicycles with reference to the handle-bar post, to which they are attached, so that the handle-bar may be turned with relation to the post to adjust the ends to varying elevations with relation to the central portion, which connects with the handle-bar post, and means for locking this adjustment at any point desired.

It also consists in details of construction, which will be more fully explained by reference to the accompanying drawings, in which—

Figure 1:
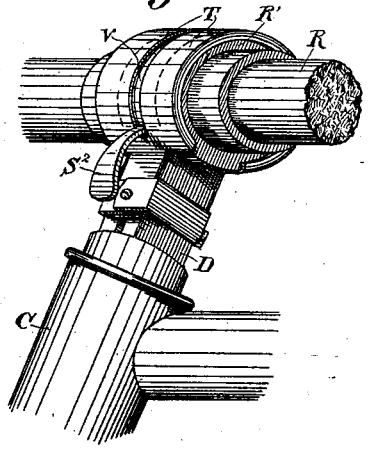
Figure 2:
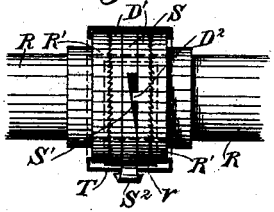
Figure 3:
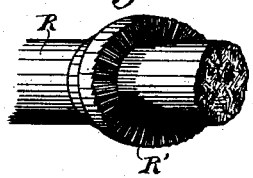
Figure 4:
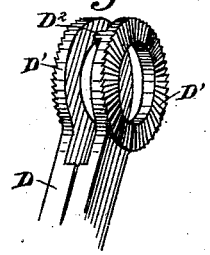

Figure 1 is a view of my handle-bar fastening. Fig. 2 is a top view of the same. Fig. 3 is a view of one of the corrugated handle-bar disks. Fig. 4 is a view of the top of the handle-bar post.

In the present case I have shown my invention as applied to an ordinary bicycle having the steering-post socket C, forming the front portion of the bicycle-frame, and the steering-post D, slidable within the socket, and it may be clamped or secured at any elevation where it is desired to fix this post.

R is the handle-bar of the machine, and in order to secure it to the post the parts are formed as follows:

The head of the handle-bar post D is made circular, as shown, and is split downwardly, so as to form an open channel between the two parts of this circular head. The outer faces of these circular heads D' D' are radially corrugated, and the handle-bar has fixed upon it correspondingly-shaped disks R', which are similarly corrugated, so that they may be caused to interlock with the corrugations on the disks D' by pressing the two together.

Holes are made centrally through the two parts of the head D', through which the handle-bar passes and within which it is turnable, with its disks R' exterior to the head D'.

When the handle-bar is in place, it passes through the central holes in the head D', and the corrugated disks R' face the corresponding exterior corrugated faces of D'.

Between the two parts of the head D', which are sufficiently separated for the purpose, is a rotary cam S. This cam-disk has two inclined or cam-shaped faces formed upon one side and radially opposite to each other, as shown at S'. It has also a projecting lug or lever-arm $S^2$, by which it is turnable in the channel between the two parts of the steering-post head.

A lug or lugs $D^2$ project from the inner face of the slot or channel in the head D', within which the cam-ring S is turnable, so that when this ring is turned to bring the lowest part of the cam-shaped groove opposite the lugs the sides D' of the steering-post head will be allowed to approach each other and become disengaged from the corrugated faces of the disks R' of the handle-bar. When this is done, the handle-bar may be turned so as to raise or depress the ends to any desired point. When the handle-bar has thus been adjusted, it is only necessary to press upon the projecting lug $S^2$ and rotate the cam-disk S so that the inclined face S' will act against the lug $D^2$, and thus separate the parts D' of the steering-post head, forcing them outward and interlocking the teeth or corrugations upon the outer faces with those of the disks R' of the handle-bar, and this will hold the parts firmly in place while allowing the adjustment to be easily changed at any time.

In order to protect these movable parts from the weather and from dust and dirt, I have shown an inclosing rim or collar T, having inturned edges which fit into corresponding annular grooves around the outer faces of the disks R', or otherwise so engage or cover the parts as to prevent the ingress of dust.

In order to allow the cam-lever $S^2$ to move for the purpose of rotating the cam, I have shown this inclosing rim or collar having a slot made in it sufficiently wide to allow the movement of the lever. This slot is covered by a curved gate V, which is fixed to and movable with the cam-lever S, and when the lever is lifted or turned to release the handle-bars this gate slides, following the curvature of the collar T, and when the handle-bar has again been locked by pressing the lever or lug S² downwardly the gate will follow it and entirely close the opening, so as to maintain a dust-tight joint.

Having thus described my invention, what I claim as new, and desire to secure by Letters Patent, is—

1. In a bicycle, the vertically-movable handle-bar post with corrugations, locking-cam and cam-block, a two-part elastic head formed of disks with corrugated exterior faces, corresponding corrugated disks fixed upon the handle-bar, a cam turnable upon the handle-bar between the two parts of the head of the handle-bar post whereby the parts may be separated and caused to engage with the disks upon the handle-bar and lock the latter in any desired position.

2. An adjusting and clamping device for handle-bars of bicycles consisting of disks fixed upon the central portion of the handle-bar having their inner faces radially corrugated, a correspondingly-shaped head for the handle-bar post having a slot formed in the upper end in line with the frame of the machine, through which head the handle-bar is adapted to pass with its corrugated disks exterior to the circular head-disks of the post, a cam fitting the channel in the head of the post and turnable about the handle-bar which passes therethrough, a lever by which the cam is actuated, and lugs with which the cam engages when turned, whereby the channeled post-head is separated and its outer faces interlocked with those of the disks upon the handle-bar and the latter is locked in any desired position.

3. The steering-post of a bicycle having a slotted head, the parts of which are movable to and from each other, and which have radially-corrugated outer surfaces as shown, central openings through which the handle-bar passes through said head, a cam fitting between the two parts turnable upon the handle-bar, and lugs with which the cam engages to separate the disks forming the head of the post, or allow them to approach each other, circular disks fitted upon the handle-bar exterior to the disks forming the post-head and correspondingly corrugated so as to be engaged thereby when the head is spread by the action of the cam, a cylindrical hood or collar inclosing the parts and having inwardly-turned flanges upon the opposite edges adapted to engage corresponding channels in the outer faces of the disks which are fixed to the handle-bar whereby they are maintained in position and protected from dust.

4. In a handle-bar adjustment of the character described, the circular rotary cam with its projecting lever, a collar or casing surrounding and inclosing the interlocking disks of the handle-bar and the steering-post head, said collar having a channel or slot in the line of travel of the movable cam-lever, and a gate fixed to the cam-lever and slidable therewith to open the channel when the lever is moved to disengage the locking mechanism, and to close the channel when the lever is moved to again interlock the parts.

In witness whereof I have hereunto set my hand.

EDWARD H. CHAPPIUS.

Witnesses:
S. H. NOURSE,
JESSIE C. BRODIE.

Correction in Letters Patent No. 604,876.

It is hereby certified that the name of the patentee in Letters Patent No. 604,876, granted May 31, 1898, for an improvement in "Cycle Handle-Bar Fastening Attachments," was erroneously written and printed "Edward H. Chappius," whereas said name should have been written and printed *Edward H. Chappuis;* and that the said Letters Patent should be read with this correction therein that the same may conform to the record of the case in the Patent Office.

Signed, countersigned, and sealed this 21st day of June, A. D., 1898.

[SEAL.]
               WEBSTER DAVIS,
               *Assistant Secretary of the Interior.*

Countersigned:
 C. H. DUELL,
  *Commissioner of Patents.*